Oct. 27, 1953
W. N. ALESHIN
2,656,538
PLANT TYING MACHINE
Filed May 11, 1949
2 Sheets-Sheet 1
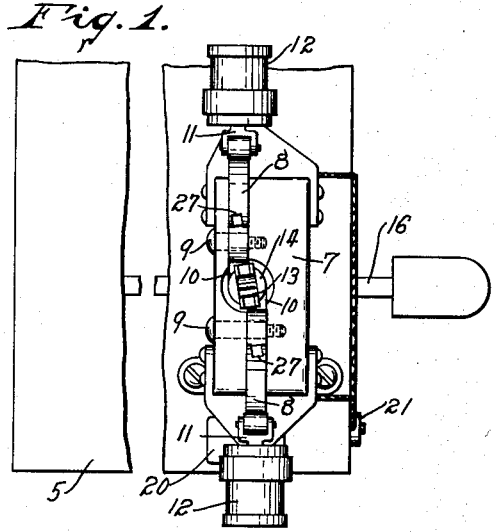
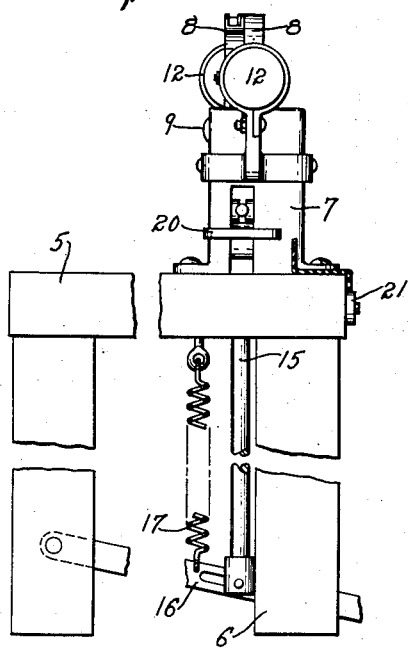
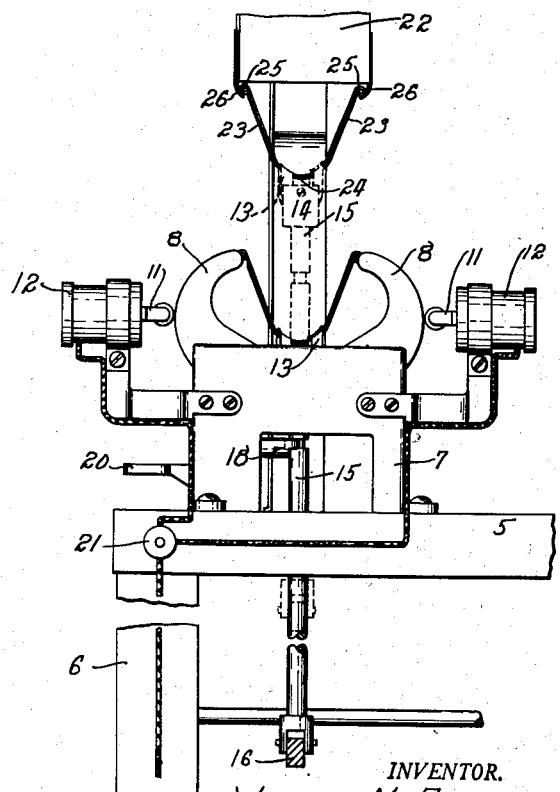
INVENTOR.
WILLIAM N. ALESHIN
BY
Louis V. Lucia
ATTORNEY Oct. 27, 1953 — W. N. ALESHIN — 2,656,538
PLANT TYING MACHINE
Filed May 11, 1949 — 2 Sheets-Sheet 2
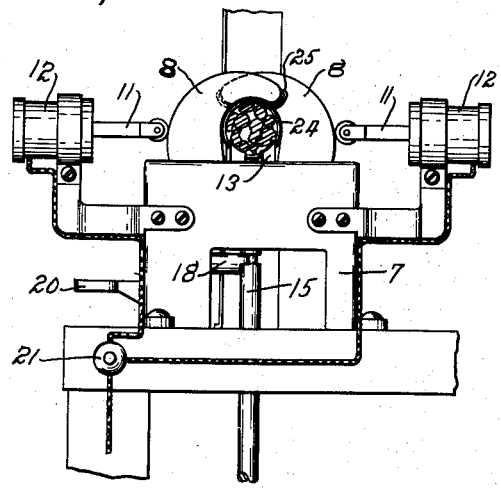
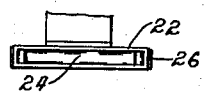
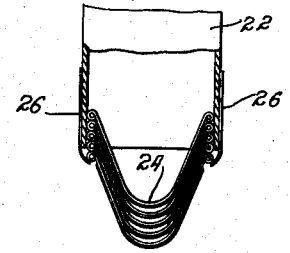
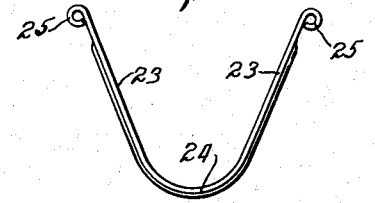
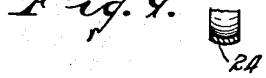
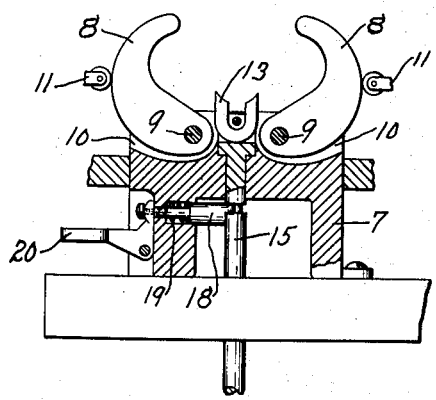
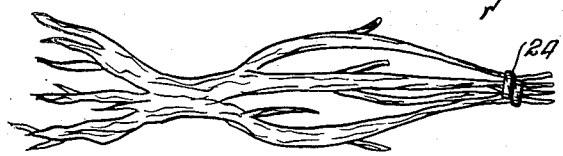
INVENTOR.
WILLIAM N. ALESHIN.
BY
*Louis V. Lucia*
ATTORNEY.

Patented Oct. 27, 1953

2,656,538

UNITED STATES PATENT OFFICE 2,656,538

PLANT TYING MACHINE

William N. Aleshin, South Windsor, Conn.

Application May 11, 1949, Serial No. 92,627

2 Claims. (Cl. 1—187)

This invention relates to a plant tying machine and more particularly to a machine for tying together the branches of plants such as rose bushes and the like.

An object of this invention is to provide a machine which will tie together the branches of a plant by applying to them a metallic clip so as to retain the said branches in a bunched position to facilitate handling of the plant.

A further object of this invention is to provide a machine of this type which is highly efficient in its operation, and easy to operate.

A further object of this invention is to provide a device which will apply metallic clips to a plant in such a manner as to not injure the plant.

Further objects and advantages will be more clearly understood from the following description and the accompanying drawing in which:

Fig. 1 is a plan view, partly broken away, of a machine embodying my invention.

Fig. 2 is a side view thereof.

Fig. 3 is a front view of said machine.

Fig. 4 is a front view illustrating the operation of my improved machine.

Fig. 5 is a front view partly in section of a portion of the mechanism of my machine.

Fig. 6 is a plan view of the clip magazine used in my machine.

Fig. 7 is a front view thereof partly in vertical section and with a quantity of clips contained therein.

Fig. 8 is an enlarged front view of one of my said clips.

Fig. 9 is a cross sectional side view of the bottom portion of one of said clips.

Fig. 10 is a view illustrating a plant after being tied in my improved machine.

As shown in the drawings, my tying machine preferably comprises a base 5 having legs 6 for supporting a frame 7 having a pair of levers 8—8 pivotally mounted thereon by means of pins 9—9 and preferably contained within slots 10—10 in said frame. The said levers are arranged on adjacent vertical planes so as to move past each other and are operated by suitable means such as plungers 11—11 which are actuated by solenoids 12—12 of the push-type to force said levers towards each other about their pivotal points.

An anvil 13, preferably in the form of a magnet, is carried in a fork 14 at the upper end of a bar 15 which is vertically slidable through the frame 7 and is operated by a lever 16 to which is secured a spring 17 for normally urging the said bar to a raised position as illustrated in dotted lines in Fig. 3.

The said bar 15 is retained in a lowered position by means of a detent 18 which is normally urged into engagement with the bar by means of a spring 19 and operated by a manually controlled lever 20.

The solenoids 12—12 are preferably jointly connected to an electric switch 21 in the form of a pushbutton which closes an electric circuit for simultaneously energizing both of said solenoids.

As further illustrated in Fig. 3, my improved machine is provided with a magazine 22 that is suitably mounted upon the base 5 for containing a quantity of metallic clips, such as shown in Fig. 8, which comprise a V-shaped member having diverging portions 23 extending upwardly from a curved base portion 24 and outwardly extending loops 25—25 at the upper ends thereof. The said clip is concavo-convex in cross section, as illustrated in Fig. 9, to provide rigidity for said clip when in applied position.

As illustrated in Figs. 6 and 7, the said magazine is elongated in shape and has a pair of opposed spring fingers 26—26 at the bottom thereof which support the said clips in the magazine and permit the bottommost clip to be withdrawn as will be hereinafter described.

In the operation of my improved machine, the lever 20 is first pressed downwardly to actuate the detent 18 and release the bar 15 to the position as illustrated in dotted lines in Fig. 3. This will bring the magnet into contact with the bottommost clip 24 in the magazine 22. The lever 16 is then pushed downwardly thus drawing the said bar and anvil with the clip thereon to the lowered position shown in full lines in Fig. 3 wherein the loops 25—25 at the end of the clip will fit within notches 27—27 in the ends of the levers 8—8. It will be noted that in this position, the clip is disposed on an axis which is at the angle to the levers 8—8.

The branches of the plant which is to be tied are then bunched together and placed in the open clip between the levers 8—8. The switch 21 is then manually operated and this will cause energization of the solenoids 12—12 which will force the plungers 11—11 outwardly and urge the levers 8—8 past each other to thereby draw the ends of the clip 24 in overlapped position around the branches of the plant as illustrated in Fig. 10. This will prevent the branches from loosening or moving out of the clip since the overlapped ends provide a secure fastening.

Releasing the switch 21 will cause the solenoids to become deenergized and the tied plant may then be lifted. As the said plant is lifted, it will swing the levers 8—8 into an overbalanced position for complete opening movement thereof.

I claim:

1. A tying machine comprising a pair of spaced pivoted levers, a bar slidable between said levers, an anvil carried by said bar to a position beyond said levers, for receiving a tying clip, and to a retracted position wherein the said anvil will support the tying clip between said levers to be bent thereby, abutment means acting against said bar for supporting the anvil in position during a bending operation upon a said tying clip, and means for operating said levers.

2. A tying machine comprising a base, a pair of spaced pivoted levers mounted on said base, a bar vertically slidable in said base between said levers, an anvil carried by said bar, a magazine for supplying tying clips to said anvil, means on the anvil for receiving a tying clip from said magazine and retaining it thereon, abutment means on said base and bar for supporting the said anvil in an operative position between said levers during the tying operation, and means for operating said levers.

WILLIAM N. ALESHIN.

References Cited in the file of this patent

UNITED STATES PATENTS

| Number | Name | Date |
| --- | --- | --- |
| 166,511 | Dobbs | Aug. 10, 1875 |
| 315,458 | Raymond | Apr. 7, 1885 |
| 489,020 | Lehmann | Jan. 3, 1893 |
| 840,441 | Damonte | Jan. 1, 1907 |
| 1,799,698 | Nolan | Apr. 7, 1931 |
| 1,810,528 | Peterson | June 16, 1931 |
| 1,950,188 | Owen | Mar. 6, 1934 |
| 2,055,257 | Maynard | Sept. 22, 1936 |
| 2,242,502 | Bangs | May 20, 1941 |
| 2,449,865 | Tanguay | Sept. 21, 1948 |

FOREIGN PATENTS

| Number | Country | Date |
| --- | --- | --- |
| 42,037 | France | May 4, 1933 |
| 264,498 | Germany | Sept. 24, 1913 |
| 284,305 | Italy | Apr. 8, 1931 |